J. R. FLEMING.

AXLE BOX.

APPLICATION FILED MAY 1, 1912.

Reissued Sept. 7, 1915. 13,976.

Witnesses
G. A. Kramer
C. S. Brown

Inventor
James R. Fleming
By Foster Freeman Watson Coit
Attorneys

UNITED STATES PATENT OFFICE.

JAMES R. FLEMING, OF SCRANTON, PENNSYLVANIA.

AXLE-BOX.

13,976. Specification of Reissued Letters Patent. Reissued Sept. 7, 1915.

Original No. 1,014,214, dated January 9, 1912, Serial No. 600,706. Application for reissue filed May 1, 1912. Serial No. 694,589.

*To all whom it may concern:*

Be it known that I, JAMES R. FLEMING, a citizen of the United States, residing at Scranton, in the county of Lackawanna and State of Pennsylvania, have invented certain new and useful Improvements in Axle-Boxes, of which the following is a specification.

This invention relates to improvements in axle boxes adapted for use in connection with mine cars and trucks; and more especially to improvements in the axle boxes shown and described in my Letters Patent No. 752,897, dated February 23, 1904, and No. 813,962, dated February 27, 1906; and my object is to provide a construction of the parts of the axle box whereby the body or bracket portion of the box will be relieved from wear, and, therefore, given a longer life; and whereby the lost motion between wheel and axle box may be readily taken up.

Figure 1:
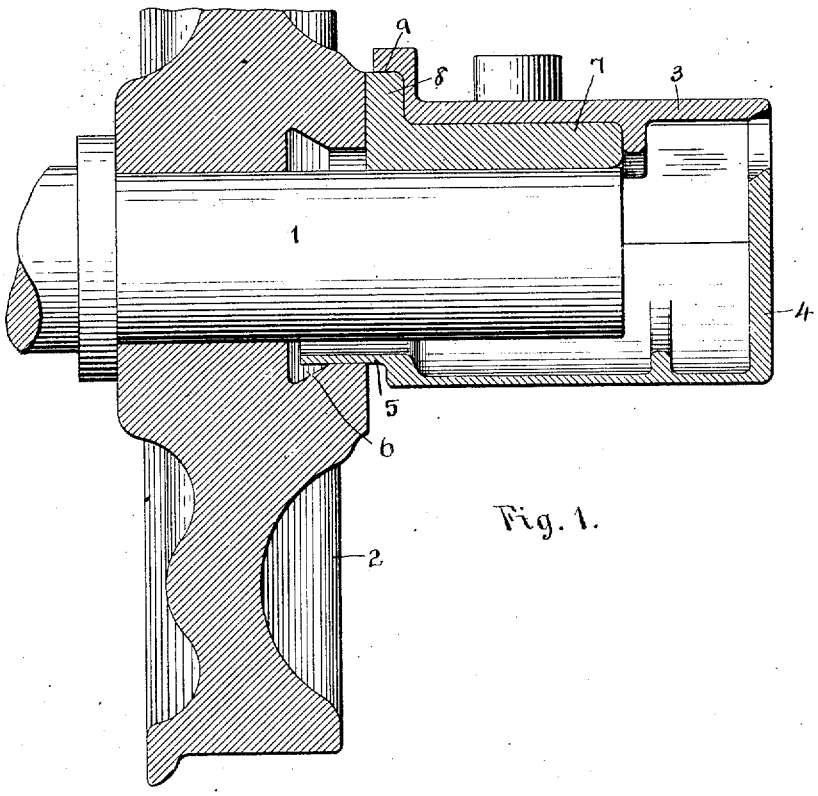
Figure 2:
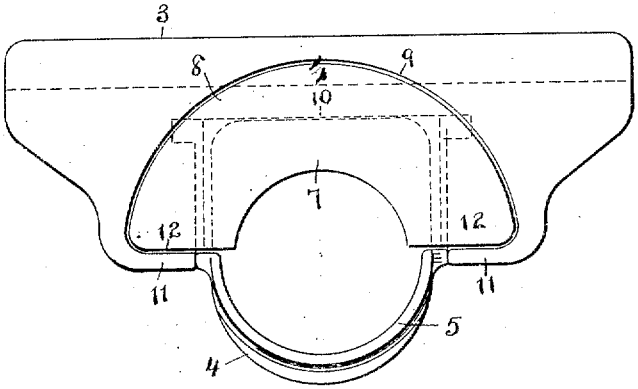
Figure 3:
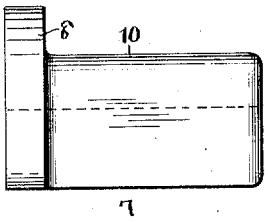

I attain my object by constructing the box in the manner illustrated in the accompanying drawings, in which, Figure 1 presents a partial view of a car wheel and axle with my box applied thereto and shown in longitudinal section; Fig. 2, an end view of the axle box looking to the right in Fig. 1; and Fig. 3, a detail showing the bearing block in side elevation.

Like numerals designate like parts in the several views.

Upon the axle end 1 is the car wheel 2, which preferably is free to turn upon the axle, although it may be fixed thereon without departing from the spirit of this invention. The axle box comprises a bracket member 3, which is adapted to be secured to the underside of the side sill of a mine car, or the like, and which is provided with a flange 3ª immediately adjacent the wheel. The lower part 4 of the axle box is in the form of a lubricant holding chamber, which is removably attached to the bracket member in the manner described in my Letters Patent No. 813,962, aforesaid. This lubricant holding portion, where the wheel is loosely mounted upon the axle, is preferably provided with a semi-cylindrical extension 5, which enters an annular lubricant chamber 6 formed in the hub of the wheel, as described in my Letters Patent No. 752,897, first mentioned. So far the construction is old, as described in my said two Letters Patent, and needs no further description.

My present invention lies in the construction of and the manner of applying the journal block 7, which is contained in the bracket member of the axle box. This journal block is provided at the inward side of the axle box with a segmental or semi-annular flange 8, which preferably corresponds in diameter with the outward face of the hub of the wheel. This flange is fitted into a corresponding segmental recess 9 formed in the bracket member, and is held against rotary motion therein, both by the flattened top 10 of the body portion of the block, and by the lips 11, formed at the opposite ends of the recess on the bracket member, which engage the ends 12 of the flange. This flange 8 is preferably so made as to project beyond the face of the bracket, as shown, in which case the wheel hub may be of larger diameter than the flange. Should the face of the flange, however, be flush with the face of the bracket, the wheel hub must be made equal to, or less in diameter than the flange, in order that the wheel thrust shall be received by the flange only, and to prevent any wear of the box or bracket. Heretofore, in making these axle boxes, the side thrust of the wheel hubs has been received directly upon the face of the bracket member, and as wear took place the face of the bracket member would be cut away to such an extent as to cause too much side play between the wheels and these side thrust bearings; and there has been no way of taking up the wear without completely renewing the bracket member of the box. This member is usually made of cast steel, and the loss occurring by reason of the discarding of a worn bracket is considerable, to say nothing of the time required to make the change. By constructing the bearing block as herein described, the bracket member is entirely relieved from this wear. Preferably I make this bearing block of cast iron, of the same grade as the wheel, so that the wear will be equal between the hub and the bearing block. As wear takes place in either hub or block, the lost motion may be taken up from time to time, either by inserting liners between the flange 8 and the inside face of the recess 9; or by inserting a new block with broader flange, which can be readily done, and at very little expense, as compared to the renewing of the bracket member.

In order to prevent the waste of oil, which would otherwise escape from the clearance space between the lubricant chamber and the wheel hub, it is desirable to provide said chamber with the extension 5 entering a groove in the wheel, whether the wheel be loose or fixed upon the axle.

Having thus described my invention what I claim is:

1. The combination with the bracket member of an axle box, of a bearing block movable relatively to said bracket member and provided with a semi-annular flange which fits into a corresponding recess in the face of said member upon the wheel side, said flange being adapted to receive the wheel thrust and having its ends engaged by transverse projections at the ends of the recess.

2. The combination with a wheel having a hub with an annular groove and an axle, of an axle box comprising a bracket member and a lubricant containing member, and a bearing block in the first member which engages the hub of the wheel, said second member having a semi-cylindrical projection which is spaced from the axle and projects into the annular groove provided therefor in the hub.

3. The combination with the bracket member of an axle box, of a bearing block removably seated in said bracket member and provided with a semi-annular flange which fits into a corresponding recess in the face of said member and is adapted to be engaged directly by the wheel hub and take the thrust thereof, the ends of said recess having walls extending toward the axle and engaging the ends of said flange.

In testimony whereof I affix my signature in presence of two witnesses.

JAMES R. FLEMING.

Witnesses:
JAMES B. LAWLER,
PATRICK J. MCLEARN.